US010518719B2

(12) United States Patent
Dellock et al.

(10) Patent No.: US 10,518,719 B2
(45) Date of Patent: *Dec. 31, 2019

(54) IRIDESCENT VEHICULAR TRIM ASSEMBLIES AND MULTI-SHOT INJECTION MOLDING METHODS FOR MAKING THE SAME

(71) Applicant: Ford Global Technologies, LLC, Dearborn, MI (US)

(72) Inventors: Paul Kenneth Dellock, Northville, MI (US); Joseph Myszka, Livonia, MI (US); David Brian Glickman, Southfield, MI (US); Stuart C. Salter, White Lake, MI (US); Talat Karmo, Waterford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/263,343

(22) Filed: Jan. 31, 2019

(65) Prior Publication Data

US 2019/0161027 A1 May 30, 2019

Related U.S. Application Data

(63) Continuation of application No. 15/298,868, filed on Oct. 20, 2016, now Pat. No. 10,239,471.

(51) Int. Cl.
| | |
|---|---|
| *B29C 45/17* | (2006.01) |
| *B60R 13/04* | (2006.01) |
| *B29C 45/14* | (2006.01) |
| *B29C 45/16* | (2006.01) |
| *G02B 27/42* | (2006.01) |
| *B29K 83/00* | (2006.01) |
| *B29K 655/02* | (2006.01) |
| *B29K 669/00* | (2006.01) |
| *B29L 9/00* | (2006.01) |
| *B29L 11/00* | (2006.01) |
| *B29L 31/30* | (2006.01) |

(52) U.S. Cl.
CPC ........ *B60R 13/04* (2013.01); *B29C 45/14688* (2013.01); *B29C 45/1671* (2013.01); *B29C 45/17* (2013.01); *G02B 27/4233* (2013.01); *B29C 2045/14885* (2013.01); *B29C 2045/1673* (2013.01); *B29K 2083/00* (2013.01); *B29K 2655/02* (2013.01); *B29K 2669/00* (2013.01); *B29K 2995/0029* (2013.01); *B29L 2009/005* (2013.01); *B29L 2011/00* (2013.01); *B29L 2031/302* (2013.01)

(58) Field of Classification Search
USPC ....................................................... 528/219
See application file for complete search history.

(56) References Cited

U.S. PATENT DOCUMENTS

| | | |
|---|---|---|
| 2,063,207 A | 12/1936 | Taylor |
| 2,890,627 A | 6/1959 | Onksen et al. |
| 4,261,031 A | 4/1981 | Fratty |
| 4,816,968 A | 5/1989 | Yamada et al. |
| 4,920,460 A | 4/1990 | Mori |
| 5,034,867 A | 7/1991 | Mayer |
| 5,612,102 A | 3/1997 | Nakama |
| 5,703,667 A | 12/1997 | Ochiai |
| 5,709,453 A | 2/1998 | Krent et al. |
| 5,724,161 A | 3/1998 | Smith et al. |
| 5,779,341 A | 7/1998 | Chinniah et al. |
| 5,871,834 A | 2/1999 | Wang |
| 6,068,890 A | 5/2000 | Kaumle et al. |
| 6,285,472 B1 | 9/2001 | Odhner et al. |
| 6,372,341 B1 | 4/2002 | Jung et al. |
| D462,032 S | 8/2002 | Schmauz-Grimsel |
| 6,525,111 B1 | 2/2003 | Spencer et al. |
| 7,068,434 B2 | 6/2006 | Florczak et al. |
| 7,207,700 B2 | 4/2007 | Fallahi et al. |
| 7,976,931 B2 | 7/2011 | Schilling et al. |
| 7,998,383 B2 | 8/2011 | Lee et al. |
| 8,033,136 B2 | 10/2011 | Maltezos et al. |
| 8,258,704 B2 | 9/2012 | Brant |
| 8,314,989 B1 | 11/2012 | Mossberg et al. |
| 8,317,379 B2 | 11/2012 | Oomen et al. |
| 8,619,363 B1 | 12/2013 | Coleman |
| 8,651,720 B2 | 2/2014 | Sherman et al. |
| 8,834,004 B2 | 9/2014 | Thompson et al. |
| 9,062,386 B2 | 6/2015 | Reeder |
| 2001/0040810 A1 | 11/2001 | Kusagaya |
| 2002/0054434 A1 | 5/2002 | Florczak et al. |
| 2002/0080622 A1 | 6/2002 | Pashley et al. |
| 2006/0061153 A1 | 3/2006 | Hamamoto et al. |
| 2006/0158888 A1 | 7/2006 | Wang |
| 2009/0050454 A1 | 2/2009 | Matsukawa et al. |
| 2010/0202154 A1 | 8/2010 | Hamkens |
| 2011/0037243 A1 | 2/2011 | Laframboise et al. |

(Continued)

FOREIGN PATENT DOCUMENTS

| | | |
|---|---|---|
| CN | 200990182 Y | 11/2006 |
| CN | 103692979 A | 4/2014 |

(Continued)

*Primary Examiner* — Terressa Boykin
(74) *Attorney, Agent, or Firm* — Vichit Chea; Price Heneveld LLP

(57) ABSTRACT

A method of making an iridescent, vehicular trim assembly is provided that includes: molding a polymeric base comprising an exterior surface; and over-molding an element over at least a portion of the exterior surface. The element comprises a polymeric, translucent material and an exterior surface with an integral diffraction grating having a thickness from 250 to 1000 nm and a period from 50 nanometers to 5 microns. Further, the molding can be conducted such that the polymeric base is molded with a tint. The method can also include forming a plated region over the exterior surface of the base. In addition, the method can also include cleaning the plated region with a plasma-etching process before the over-molding.

20 Claims, 5 Drawing Sheets

(56) References Cited

U.S. PATENT DOCUMENTS

| | | | |
|---|---|---|---|
| 2014/0009838 A1 | 1/2014 | Weber et al. |
| 2015/0079375 A1 | 3/2015 | Yang et al. |
| 2015/0371570 A1 | 12/2015 | Sciackitano et al. |
| 2016/0107371 A1 | 4/2016 | Hurme et al. |
| 2016/0231493 A1 | 8/2016 | Iordache et al. |
| 2016/0273721 A1 | 9/2016 | Pijlman et al. |
| 2017/0080784 A1 | 3/2017 | Kobayashi et al. |
| 2017/0297507 A1 | 10/2017 | Dellock et al. |
| 2017/0297508 A1 | 10/2017 | Dellock et al. |
| 2018/0111570 A1 | 4/2018 | Dellock et al. |

FOREIGN PATENT DOCUMENTS

| | | |
|---|---|---|
| EP | 0870655 A1 | 10/1998 |
| GB | 292167 A | 7/1929 |
| JP | H0572593 U | 10/1993 |
| JP | H10172310 A | 6/1998 |
| JP | 2006023567 A | 1/2006 |
| JP | 2010214798 A | 9/2010 |
| JP | 2013154670 A | 8/2013 |
| KR | 101209331 | 11/2012 |
| WO | 9704339 | 2/1997 |
| WO | 9900623 A1 | 1/1999 |

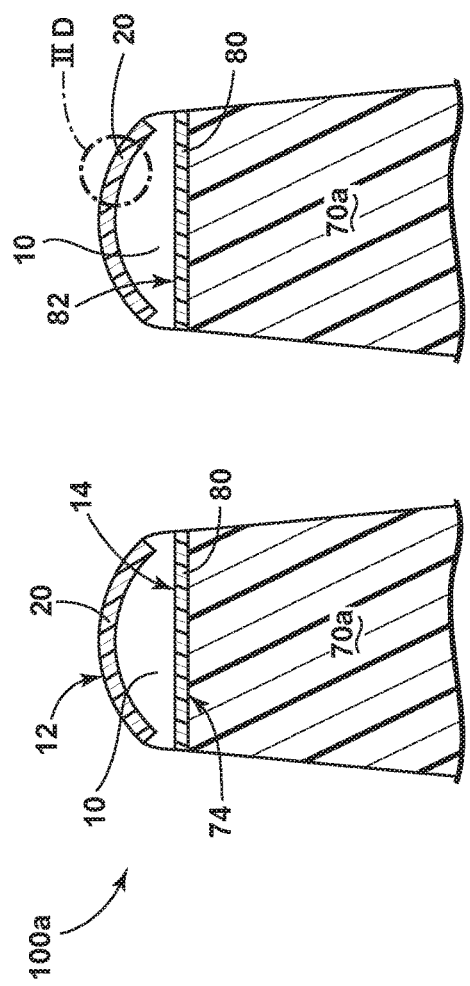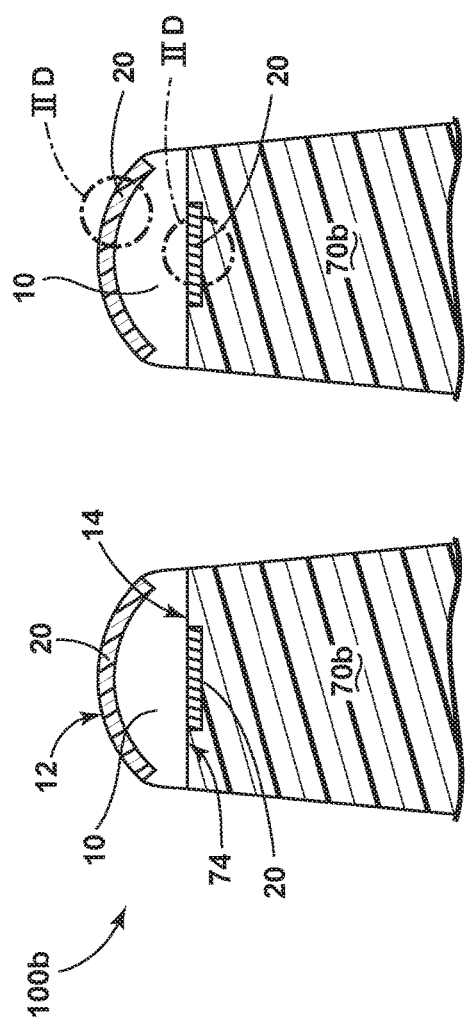

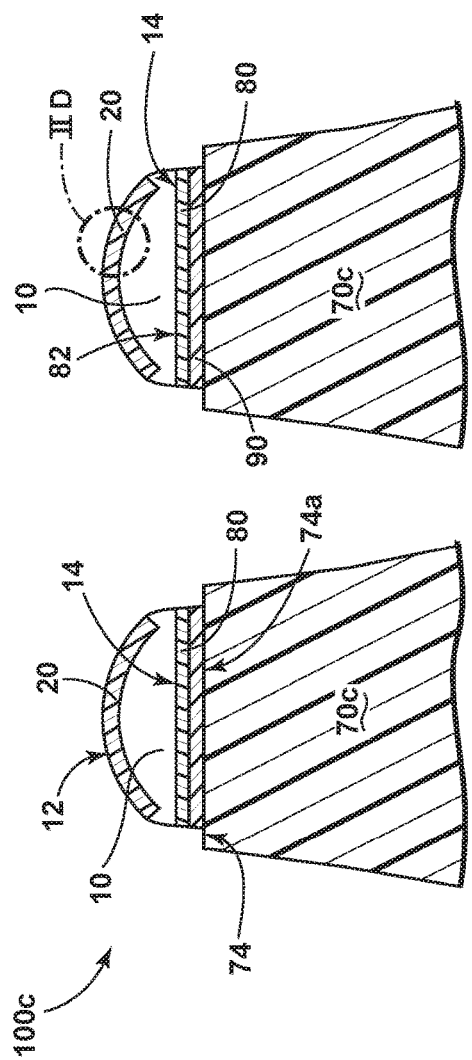
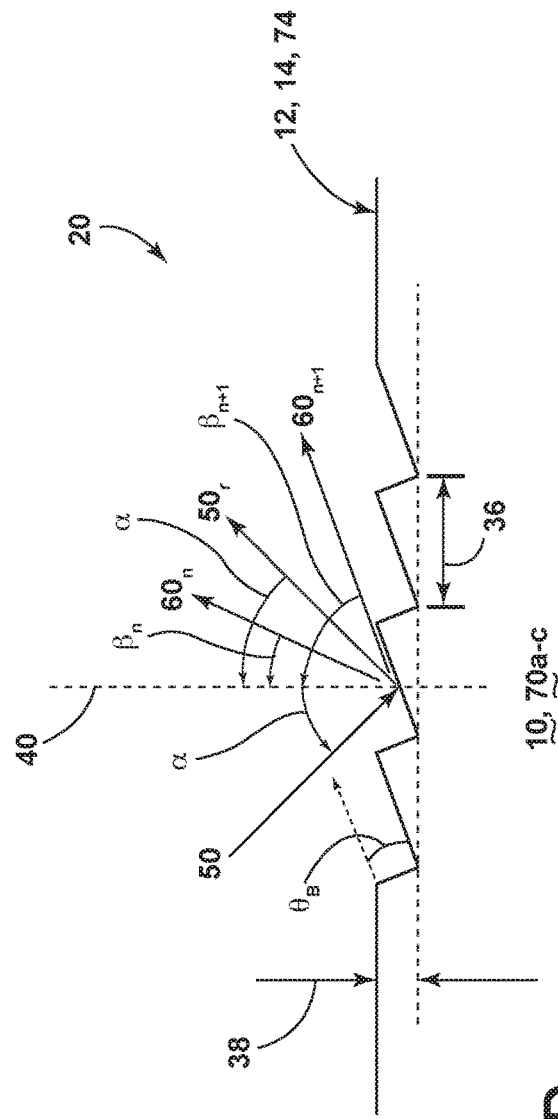
FIG. 2C
FIG. 2D

IRIDESCENT VEHICULAR TRIM ASSEMBLIES AND MULTI-SHOT INJECTION MOLDING METHODS FOR MAKING THE SAME

CROSS REFERENCE TO RELATED APPLICATIONS

This application is a continuation application that claims priority to and the benefit under 35 U.S.C. § 120 of U.S. patent application Ser. No. 15/298,868 filed on Oct. 20, 2016, issued as U.S. Pat. No. 10,239,471 on Mar. 26, 2019, entitled "IRIDESCENT VEHICULAR TRIM ASSEMBLIES AND MULTI-SHOT INJECTION MOLDING METHODS FOR MAKING THE SAME," the entire disclosure of which is incorporated by reference herein.

FIELD OF THE INVENTION

The present invention generally relates to iridescent trim assemblies and other exterior vehicular elements, along with methods of making the same, particularly automotive grilles with a jewel-like appearance.

BACKGROUND OF THE INVENTION

Car enthusiasts and owners of luxury and high-end vehicles are continually demanding new aesthetics that justify, at least in part, the high cost of such vehicles. Vehicle grilles and other trim elements can be designed to reflect the luxury and high-end nature of particular vehicle models. For example, vehicular grilles are often fabricated with interesting shapes and design aspects, some of which may exhibit a chrome-like appearance, particular colors and/or other surface finishes. Conceivably, other ornamental features, such as jewels, incorporated within a grille or other trim element might also be of some interest to a potential buyer of a high-end vehicle.

The direct incorporation of jewels, precious metals and/or gemstones into a vehicle grille or trim element might satisfy these needs in some respects at first glance. These jewels, gemstones and precious metals might be encapsulated within a translucent grille for a luxurious aesthetic. Nevertheless, merely adding jewels, precious metals, gemstones and the like to conventional grilles and other trim elements will significantly increase the overall component cost, and all but the most cost-insensitive car enthusiasts will likely object to the significant added cost of these grilles and trim elements. In addition, the inclusion of jewels, gemstones and/or precious metals into a vehicular grille increases the likelihood that these individually valuable features will be removed by thieves as a target of relative opportunity.

Other approaches to upgrading the aesthetics of exterior vehicular elements have focused on mimicking the look of diamonds and jewels within a molded plastic part. For example, it is feasible to make faceted, plastic trim pieces, in which the facets are visible to the unaided eye, that attempt to approximate the look of actual diamonds and jewels. Unfortunately, the results of such approaches are not promising. Generally, such trim features appear to look like costume jewelry and, arguably, could detract from the overall aesthetic of a luxury vehicle rather than enhance it.

Accordingly, there is a need for exterior vehicular elements, such as grilles and trim elements (and methods of making them), that exhibit an iridescent or jewel-like appearance without a significant cost increase associated with the enhancement. In addition, these iridescent, vehicular trim assemblies should maintain their appearance over a vehicle lifetime while being exposed to a typical vehicular environment.

SUMMARY OF THE INVENTION

According to one aspect of the present invention, an iridescent, vehicular trim assembly is provided that includes: a polymeric base comprising an exterior surface; and an over-molded element joined to at least a portion of the exterior surface. The element comprises a polymeric, translucent material and an exterior surface with an integral diffraction grating having a thickness from 250 to 1000 nanometers and a period from 50 nanometers to 5 microns.

According to another aspect of the present invention, a method of making an iridescent, vehicular trim assembly is provided that includes: molding a polymeric base comprising an exterior surface; and over-molding an element over at least a portion of the exterior surface. The element comprises a polymeric, translucent material and an exterior surface with an integral diffraction grating having a thickness from 250 to 1000 nm and a period from 50 nanometers to 5 microns.

A method of making an iridescent, vehicular trim assembly is provided that includes: molding a polymeric base with a tint; forming a plated region over an exterior surface of the base; and over-molding an element over the plated region. The element comprises a polymeric, translucent material and an exterior surface with an integral diffraction grating having a thickness from 250 to 1000 nm and a period from 50 nanometers to 5 microns.

According to another aspect of the present invention, an iridescent, vehicular trim assembly is provided that includes: a polymeric base comprising an exterior surface; and an over-molded element joined to at least a portion of the exterior surface. Each of the element and the base comprises a polymeric material and an exterior surface with an integral diffraction grating having a thickness from 250 to 1000 nanometers and a period from 50 nanometers to 5 microns.

According to a further aspect of the present invention, an iridescent, vehicular trim assembly is provided that includes: a polymeric base; a plated region and a plating over at least a portion of the polymeric base; and an over-molded element joined to the at least a portion of the base. The element comprises a polymeric, translucent material and an exterior surface with an integral diffraction grating having a thickness from 250 to 1000 nanometers and a period from 50 nanometers to 5 microns.

According to an additional aspect of the present invention, an iridescent, vehicular trim assembly is provided that includes: a polymeric base comprising an exterior surface; and an over-molded element joined to at least a portion of the exterior surface. Each of the element and the base comprises a polymeric material and one of the element and the base comprises an exterior surface with an integral diffraction grating having a thickness from 250 to 1000 nanometers and a period from 50 nanometers to 5 microns.

These and other aspects, objects and features of the present invention will be understood and appreciated by those skilled in the art upon studying the following specification, claims, and appended drawings.

BRIEF DESCRIPTION OF THE DRAWINGS

In the drawings:

FIG. 2A is a cross-sectional, schematic view of a grille assembly, such as depicted in FIG. 1, through line IIA-IIA according to an aspect of the disclosure;

FIG. 2B is a cross-sectional, schematic view of a grille assembly, such as depicted in FIG. 1, through line IIB-IIB according to an additional aspect of the disclosure;

FIG. 2C is a cross-sectional, schematic view of a grille assembly, such as depicted in FIG. 1, through line IIC-IIC according to a further aspect of the disclosure;

FIG. 2D is an enlarged cross-sectional schematic view a diffraction grating incorporated into the grille assemblies depicted in FIGS. 1 and 2A-2C;

DETAILED DESCRIPTION OF THE PREFERRED EMBODIMENTS

Figure 1:
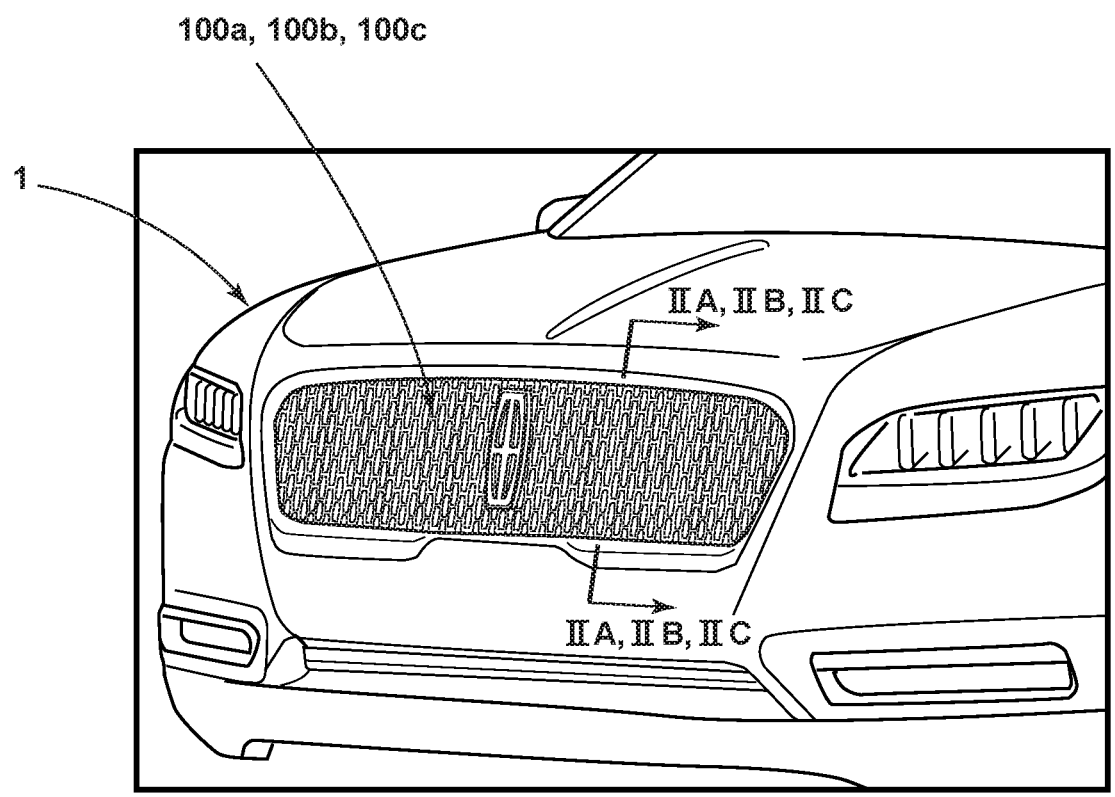
FIG. 1 is a front perspective view of an iridescent trim assembly in the form of a grille affixed to the front of a vehicle according to an aspect of the disclosure.

For purposes of description herein, the terms "upper," "lower," "right," "left," "rear," "front," "vertical," "horizontal," "interior," "exterior," "vehicle forward," "vehicle rearward," and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Described in this disclosure are iridescent trim assemblies, including grille assemblies and other iridescent exterior elements, for vehicles (collectively, "iridescent vehicular assemblies"), and methods of making these assemblies. The iridescent vehicular assemblies contain one or more diffraction gratings that are integral with one or more component(s) of the elements (e.g., an over-molded element, a polymeric base, etc.), each of which provides sparkle and iridescence to the assembly. Various microscopic features can be added or adjusted within the gratings to achieve varied aesthetic effects. Gratings can also be incorporated into various regions within the iridescent trim assembly to achieve other varied, aesthetic effects. Further, the polymeric base of these assemblies can be tinted or plated to produce additional aesthetic effects. As the over-molded element of these assemblies is translucent in certain implementations, the tinting and/or plating of the polymeric base is visible through the over-molded element. As for manufacturing and processing, these iridescent trim assemblies, and other iridescent vehicular assemblies consistent with the concepts of this disclosure, can advantageously be injection molded according to multi-shot approaches.

Referring to FIG. 1, a front perspective view is provided of iridescent vehicular trim assemblies 100a, 100b, 100c that can each be affixed to the front of a vehicle 1 (e.g., in the form of a grille assembly) according to aspects of the disclosure. As depicted, the trim assemblies 100a, 100b, 100c are each characterized by an iridescent or jewel-like appearance under ambient lighting (e.g., from the sun). One or more diffraction gratings 20 (see FIGS. 2A-2D) are integral with one or more components of the trim assemblies 100a, 100b, 100c. In preferred aspects, these diffraction gratings 20 provide the iridescent or jewel-like appearance of the trim assemblies 100a, 100b, 100c.

As shown in FIGS. 2A-2C, the iridescent trim assemblies 100a, 100b, and 100c each include a polymeric base 70a-c, respectively, and an over-molded element 10. The polymeric base 70a-c employed in these trim assemblies is defined at least by an exterior surface 74. For clarity, interior surfaces of the polymeric base 70a-c are not shown, but one with ordinary skill in the field of the disclosure will recognize that one or more interior surfaces of the polymeric base can be affixed, attached or otherwise joined to a vehicle, such as vehicle 1 (see FIG. 1), for purposes of employing one or more of these trim assemblies 100a-c with a given vehicle. As for the over-molded element 10 depicted in FIGS. 2A-2C, it can be defined by one or more exterior surfaces 12 and one or more interior surfaces 14.

With regard to the polymeric base 70a-c employed in the trim assemblies 100a-c depicted in FIGS. 2A-2C, it may comprise any of a number of polymeric materials. For example, these polymeric materials can be a thermoset, a thermoplastic or a combination or a mixture of these types of polymeric materials, e.g., silicones, acrylics and polycarbonates. Preferably, the precursor material(s) employed to fabricate the polymeric base 70a-c have a high flow rate and/or a low viscosity during a molding process such as injection molding. In certain aspects, fillers (not shown), e.g., glass, glass-ceramic and/or ceramic beads, particles, fibers, and whiskers, can be added to a polymeric material, serving as a matrix, to form the polymeric base 70a-c without significant detriment to the visual aesthetic of the base 70a-c. These fillers can provide added durability and/or additional aesthetic effects to the iridescent trim assemblies 100a-c. According to an embodiment, glass fillers are added in the range of 5 to 15% by volume to enhance the durability of the base 70a-c to wear and other environmental effects.

In some aspects of the disclosure, the polymeric base 70a-c depicted in FIGS. 2A-2C is tinted with any of a number of colors, including white and black pigments and colorant additives. In such aspects, for example, the tinted polymeric base 70a-c can be fabricated from an acrylic, a polycarbonate, a nylon, an acrylonitrile styrene acetate (ASA) and combinations of these materials, all of which are conductive to tinting and other coloration. According to other embodiments, the polymeric base 70a-c can be configured with a plating 80 over the exterior surface 74 (see, e.g., FIG. 2A). In such aspects, the polymeric base 70a-c can be fabricated from an acrylonitrile butadiene styrene (ABS), a polycarbonate or a combination of these polymeric materials, all of which can be conducive to a process for directly applying a plating 80 to its exterior surface 74.

Referring again to the polymeric base 70a-c depicted in FIGS. 2A-2C, it can take on any of a variety of shapes, depending on the nature of the iridescent trim assembly 100a-c employing the base. For example, the polymeric base 70a-c can take on a shape with a large aspect ratio when employed in an iridescent trim assembly 100a-c in the form of a vehicular grille. In other aspects of the disclosure, the base 70a-c can take on nearly any shape indicative of the application of the iridescent trim assembly 100a-c, e.g., with one or more curved surfaces, one or more planar surfaces, etc. According to an aspect of the disclosure, the shape of the polymeric base 70a-c is limited only by shapes and configurations not suitable for manufacturing with injection molding apparatus and associated methods. In preferred aspects, the polymer base 70a-c is shaped with one or more planar exterior surfaces 74 conducive to the attachment or joining of a polymeric feature, such as over-molded element 10, by an over-molding process.

Still further, the polymeric base 70a-c of the iridescent trim assembly 100a-c depicted in FIGS. 2A-2C can consist of a single component in a preferred embodiment. In other aspects, however, the polymeric base 70a-c can be formed from multiple parts, preferably with the parts joined, without significant detriment to the overall properties of the base 70a-c. Manufacturing-related considerations may drive the need or desire to configure the polymeric base 70a-c as one component or as joined from multiple components.

Now referring to the over-molded element 10 depicted in FIGS. 2A-2C, it may be joined or otherwise attached to one or more exterior surfaces 74 of the polymeric base 70a-c. Typically, the interior surface 14 of the over-molded element 10 is joined or otherwise attached to the exterior surface 74 of the polymeric base 70a-c. In preferred embodiments, the over-molded element 10 is fabricated from a polymeric, translucent material. According to some implementations of an iridescent trim assembly 100a-c, the over-molded element 10 is characterized by an optical transmissivity of 85% or more over the visible spectrum (e.g., from about 390 nm to about 700 nm). Preferably, the over-molded element 10 is characterized by an optical transmissivity of 90% or more, and even more preferably, 95% or more, over the visible spectrum. Further, the over-molded element 10 can be optically clear with no substantial coloration. In other embodiments, the over-molded element 10 can be tinted or otherwise affixed with one or more filters on its exterior surfaces 12 and/or interior surfaces 14 to obtain a desired hue (e.g., blue, red, green, etc.) or other visual effect.

Referring again to FIGS. 2A-2C, the over-molded element 10 of the iridescent trim assemblies 100a-c is typically fabricated from a polymeric material. These polymeric materials include thermoplastic and thermosetting polymeric materials, e.g., silicones, acrylics, epoxies and polycarbonates. Preferably, the precursor material(s) employed to fabricate the over-molded element 10 have a high flow rate and/or a low viscosity during a molding process such as injection molding. In certain aspects, fillers (not shown), including but not limited to glass beads and particles, can be added to a polymeric material, serving as a matrix, to form the over-molded element 10 without significant detriment to the optical properties of the element. These fillers can provide added durability and/or additional aesthetic effects to the iridescent trim assembly 100a-c by virtue of being incorporated into the over-molded element 10. Preferably, glass fillers, particles and other related reinforcements, are added in the range of 1 to 15% by volume, depending on the nature of the filler and the desired effect (e.g., enhanced durability, added light scattering, etc.).

With further regard to the over-molded element 10 employed in the iridescent trim assembly 100a-c, the element can take on any of a variety of shapes, depending on the nature of the trim assembly and other design considerations. For example, in some embodiments, one or more of the exterior and interior surfaces 12, 14 of the over-molded element 10 are planar (e.g., faceted), non-planar, curved or characterized by other shapes. As also understood by those with ordinary skill in the field, the exterior and interior surfaces 12, 14 can be characterized with portions having planar features and portions having non-planar features. As depicted in FIGS. 2A-2C in exemplary form, for example, the over-molded element 10 employed in the iridescent trim assembly 100a-c in the form of a grille has a non-planar (e.g., curved) exterior surface 12 comprising a diffraction grating 20 and a planar interior surface 14. The non-planar exterior surface 12 aids in ensuring that moisture, dirt, and other environmental contaminants are limited in extent of their contact with the over-molded element 10. The planar interior surface 14 aids in joining, bonding or otherwise attaching the over-molded element 10 to the underlying polymeric base 70a-c. Nevertheless, other shape factors may be employed for the over-molded element 10, as motivated by manufacturability, aesthetics, trim assembly design considerations and combinations of these factors.

Again referring to the over-molded element 10 depicted in FIGS. 2A-2C, it can consist of a single component in a preferred embodiment. For example, the over-molded element 10 can be formed as a single piece with an integral diffraction grating 20 from an injection molding process employing a single mold. In other aspects, however, the over-molded element 10 can be formed from multiple parts, preferably with the parts joined, without significant detriment to the overall properties of the element 10. Manufacturing-related considerations may drive the need or desire to configure the over-molded element 10 as one component or as joined from multiple components, and joined or otherwise attached to the polymeric base 70a-c.

With regard to the configurations of the iridescent trim assemblies 100a-c employing a plating 80 (see, e.g., FIGS. 2A and 2C) over the polymeric base 70a-c, the plating can include one or more materials capable of being deposited through conventional electro-plating technologies. In certain implementations, the plating 80 is applied over all or portions of the exterior surface 74 of the polymeric base 70a-c. As used herein, the "plating," such as plating 80, can refer to one or more continuous or semi-continuous regions of the plating 80 disposed on the polymeric base 70a-c. In certain aspects, the plating 80 can be fabricated from materials suitable for achieving a bright chrome, satin nickel, satin chrome, satin aluminum, gold, copper, silver, bronze and other finishes. These materials employed in the plating 80 can include one or more metals, e.g., nickel, chromium, aluminum, gold, silver and others. Further, other processes besides conventional electro-plating techniques may be employed to prepare the plating 80, including but not limited to anodizing and vacuum deposition methods.

In certain implementations of the iridescent trim assemblies 100a-c employing a plating 80 (see, e.g., FIGS. 2A and 2C), the exterior surface of the plating is subjected to a cleaning treatment prior to the formation and joining of the over-molded element 10 over the polymeric base 70a-c. More particularly, the plating 80 can be contacted with a plasma arc for a period of time (e.g., 5 to 60 minutes) at an intensity sufficient to modify the surface of the plating 80 to enhance adhesion of the polymeric material employed in the over-molded element 10. In certain implementations, the plasma arc cleans the surface of the plating 80 by forcibly removing impurities. The plasma arc also etches the surface of the plating 80 to a surface roughness indicative of material removal from about 20 to 500 Angstroms below the surface of the plating 80. Ultimately, the effect of the plasma arc on the plating 80 is to roughen its surface at a level not observable to the unaided eye, but at a level sufficient to enhance the bonding and joining of the plating 80 with the over-molded element 10. Accordingly, the intended appearance of the plating 80 through the over-molded element 10, which is typically translucent, is not visibly affected by the plasma-cleaning surface treatment.

Now referring to FIGS. 2A-2C, the iridescent trim assemblies 100a-c can employ one or more integral diffraction gratings 20 within the over-molded element 10 and/or within the polymeric base 70a-c. For example, an exterior surface 12 of the over-molded element 10 of the iridescent vehicular trim assembly 100a, 100b, 100c includes one or more diffraction gratings 20, preferably integral with the over-molded element 10. As depicted in exemplary fashion in FIGS. 2A-2C, the iridescent vehicular trim assemblies 100a, 100b, 100c include an over-molded element 10 with a non-planar exterior surface 12 having one or more integral diffraction gratings 20. Some aspects of the iridescent trim assemblies 100a-c include a polymeric base 70a-c with one or more integral diffraction gratings 20. These diffraction gratings 20, for example, can be fabricated within or in close proximity to the exterior surface 74 of the polymeric base 70a-c (see, e.g., FIG. 2B). Preferably, aspects of the iridescent trim assemblies 100a-c employing one or more diffraction gratings 20 in the polymeric base 70a-c do not employ a plating 80 or otherwise employ a plating 80 in regions of the assembly away from the diffraction grating 20 in the polymeric base 70a-c. Accordingly, those configurations of the iridescent trim assemblies 100a-c employing diffraction gratings 20 in their respective polymeric bases 70a-c do so such that these gratings 20 are visible through the over-molded element 10 without obstruction by any plating 80.

As shown schematically in FIG. 2D in cross-sectional form, the diffraction gratings 20 of the over-molded element 10 and/or polymer base 70a-c of iridescent trim assemblies 100a, 100b, 100c are formed at a microscopic level. In an embodiment, the diffraction gratings 20 have a thickness 38 that ranges from 250 nm to 1000 nm. The thickness 38 of the diffraction gratings 20, for example, should be maintained in the range of 250 to 1000 nm to ensure that the iridescent trim assemblies 100a-c (see FIGS. 2A, 2B and 2C) exhibit a jewel-like appearance through light diffraction upon illumination in direct ambient lighting while also having a minimal effect on the optical clarity of the trim assemblies under non-direct ambient lighting. Preferably, the thickness 38 of the diffraction gratings 20 ranges from about 390 nm to 700 nm. In other embodiments, the thickness 38 of the diffraction gratings 20 ranges from 500 nm to 750 nm.

As also shown schematically in FIG. 2D, the grooves of the diffraction gratings 20 within the over-molded element 10 and/or polymer base 70a-c of an iridescent trim assembly 100a, 100b, 100c can be configured in various shapes to diffract incident light and produce an iridescent and jewel-like appearance. As depicted in FIG. 2D in exemplary form, the gratings 20 have a sawtooth or triangular shape. In three dimensions, these gratings 20 can appear with a stepped or sawtooth shape without angular features (i.e., in the direction normal to what is depicted in FIG. 2D), pyramidal in shape, or some combination of stepped and pyramidal shapes. Other shapes of the diffraction gratings 20 include hill-shaped features (not shown)—e.g., stepped features with one or more curved features. The diffraction gratings 20 can also include portions with a combination of triangular and hill-shaped features. More generally, the shapes of the gratings 20 should be such that an effective blazing angle $\theta_B$ of at least 15 degrees is present for one or more portions of each grating, tooth or groove of the diffraction gratings 20. The blaze angle $\theta_B$ is the angle between step normal (i.e., the direction normal to each step or tooth of the grating 20) and the direction normal 40 to the exterior and interior surfaces 12, 14, 74 of the over-molded element 10 and/or polymeric base 70a-c having the grating 20.

Generally, the blaze angle $\theta_B$ (see FIG. 2D) is optimized to maximize the efficiency of the wavelength(s) of the incident light, typically ambient sunlight, to ensure that maximum optical power is concentrated in one or more diffraction orders while minimizing residual power in other orders (e.g., the zeroth order indicative of the ambient light itself). An advantage of situating a diffraction grating 20 on planar portions or aspects of the exterior and interior surfaces 12, 14, 74 of the over-molded element 10 and/or polymeric base 70a-c (e.g., as shown in exemplary form in FIG. 2B on a planar portion of the interior surface 14 and exterior surface 74) is that a constant blaze angle $\theta_B$ and period 36 will result in consistent reflected and diffracted light produced from the diffraction grating. Such consistency can be employed by a designer of the iridescent trim assembly 100a-c to ensure that particular jewel-like effects are observable by individuals at different locations and distances from the trim assemblies 100a-c.

As also shown schematically in FIG. 2D, the diffraction gratings 20 of the over-molded element 10 and/or polymer base 70a-c of an iridescent trim assembly 100a, 100b, 100c are characterized by one or more periods 36 (also known as d in the standard nomenclature of diffraction gratings). In most aspects of the trim assemblies 100a-c (see, e.g., FIGS. 2A-2C), the period 36 of the diffraction grating 20 is maintained between about 50 nm and about 5 microns. In general, the maximum wavelength that a given diffraction grating 20 can diffract is equal to twice the period 36. Hence, a diffraction grating 20 with a period 36 that is maintained between about 50 nm and about 5 microns can diffract light in an optical range of 100 nm to about 10 microns. In a preferred embodiment, the period 36 of a diffraction grating 20 is maintained from about 150 nm to about 400 nm, ensuring that the grating 20 can efficiently diffract light in an optical range of about 300 nm to about 800 nm, roughly covering the visible spectrum.

Referring again to FIG. 2D, an integral diffraction grating 20 along a portion of exterior surface 12 of an over-molded element 10 or along an exterior surface 74 of a polymeric base 70a-c (i.e., as otherwise adjacent to the interior surface 14 of the over-molded element 10 as depicted in FIG. 2B) is depicted in exemplary form. Incident light 50 (typically ambient sun light) at an incident angle α is directed against a sawtooth-shaped diffraction grating 20 having a thickness 38, a period 36 and a blaze angle $\theta_B$. More particularly, a portion of the incident light 50 (preferably, a small portion) striking the grating 20 at an incident angle α is reflected as reflected light 50r at the same angle α, and the remaining portion of the incident light 50 is diffracted at particular wavelengths corresponding to diffracted light $60_n$, $60_{n+1}$, etc. at corresponding diffraction angles $β_n$, $β_{n+1}$, etc. The reflected light $50_r$ is indicative of the zeroth order (i.e., n=0) and the diffracted light $60_n$, $60_{n+1}$, etc. are indicative of the nth order diffraction according to standard diffraction grating terminology, where n is an integer corresponding to particular wavelengths of the reflected or diffracted light.

Integral diffraction gratings 20, such as depicted in an enlarged, schematic format in FIG. 2D, are advantageous within the iridescent trim assemblies 100a, 100b, 100c (see FIGS. 2A-2C), particularly within the polymeric base 70a-c, due to their protected location. In particular, these gratings 20 are generally protected from damage, alteration and/or wear due to their location as integral within the polymeric base 70a-c underneath the over-molded element 10 (see FIG. 2B). Given that incident light 50 must pass through the element 10 to reach the grating 20 within the polymeric base 70a-c and that diffracted light 60$_n$, 60$_{n+1}$, etc., must also pass through the over-molded element 10 to produce an iridescent effect, the diffraction efficiency of gratings 20 within a polymeric base 70a-c can be somewhat lower than the diffraction efficiency of diffraction gratings 20 that are located integrally within the over-molded element 10 due to the light absorption within the element 10. On the other hand, diffraction gratings 20, as configured within the exterior surface 12 of the over-molded element 10 (see FIGS. 2A and 2C) are more susceptible to damage, alteration and/or wear than diffraction gratings 20 within the polymeric base 70a-c. Accordingly, a preferred embodiment of the iridescent trim assemblies 100a-c includes diffraction gratings 20 integral within both of the over-molded element 10 and the polymeric base 70a-c to balance diffraction efficiency and wear resistance.

Referring back to FIGS. 1 and 2A, one implementation of an iridescent trim assembly 100a is depicted in a cross-sectional schematic, exemplified in the form of an iridescent vehicular grille. More particularly, the trim assembly 100a includes a polymeric base 70a defined at least in part by an exterior surface 74. In certain aspects, as shown in FIG. 2A, the polymeric base 70a of the trim assembly 100a contains a plating 80, which may by disposed over all or portions of the exterior surface 74. The trim assembly 100a also includes an over-molded element 10 that comprises a polymeric, translucent material. The over-molded element 10 is defined by an exterior surface 12 and an interior surface 14, and is joined to at least a portion of the exterior surface 74 (e.g., at the interior surface 14 as shown in FIG. 2A) of the polymeric base 70a. Further, the over-molded element 10 includes one or more integral diffraction gratings 20 (see also FIG. 2D). In some implementations, as shown in FIG. 2D, the diffraction grating 20 has a thickness 38 from 250 to 1000 nanometers and a period 36 from about 50 nanometers to 5 microns.

According to certain aspects of the iridescent trim assembly 100a depicted in FIGS. 1 and 2A, the over-molded element 10 is fabricated from a silicone, preferably a low-viscosity, high flow material to promote flow during injection molding of one or more integral diffraction gratings 20. In some embodiments, the plating 80 over the exterior surface 74 of the polymeric base 70a is cleaned, etched or otherwise subjected to a surface treatment to promote adhesion between the over-molded element 10 and the plating 80. Preferably, the plating 80 is subjected to a plasma-treatment to clean and etch the plating 80 for this purpose. Further, in some embodiments of the trim assembly 100a, the polymeric base 70a is fabricated from one or more of an acrylonitrile butadiene styrene (ABS) and a polycarbonate material, as these materials are conducive, or otherwise can be configured, to promote adhesion of the plating 80.

Referring now to FIGS. 1 and 2B, an implementation of an iridescent trim assembly 100b is depicted in a cross-sectional schematic, exemplified in the form of an iridescent vehicular grille. More particularly, the trim assembly 100b includes a polymeric base 70b defined at least in part by an exterior surface 74. In certain aspects, as shown in FIG. 2B, the polymeric base 70b of the trim assembly 100b can contain one or more integral diffraction gratings 20, which are disposed within, or in proximity to, the exterior surface 74. The trim assembly 100b also includes an over-molded element 10 that comprises a polymeric, translucent material. The over-molded element 10 is defined by an exterior surface 12 and an interior surface 14, and is joined to at least a portion of the exterior surface 74 (e.g., at the interior surface 14 as shown in FIG. 2B) of the polymeric base 70b. Further, the over-molded element 10 includes one or more integral diffraction gratings 20 (see also FIG. 2D). In some implementations, as shown in FIG. 2D, the diffraction grating 20 has a thickness 38 from 250 to 1000 nanometers and a period 36 from about 50 nanometers to 5 microns.

According to certain aspects of the iridescent trim assembly 100b depicted in FIGS. 1 and 2B, the over-molded element 10 is fabricated from a silicone, preferably a low-viscosity, high flow material to promote flow during injection molding of one or more integral diffraction gratings 20. Further, in some embodiments of the trim assembly 100b, the polymeric base 70b is tinted to exhibit one or more colors, white, grey and/or black features. As such, the polymeric base 70b can be fabricated from one or more polymeric materials including an acrylic, a polycarbonate, a polypropylene, a nylon, an acrylonitrile styrene acrylate and combinations of these polymeric materials. In addition, certain implementations of the trim assembly 100b are fabricated such that at least a portion of the exterior surface 74 of the polymeric base 70b is cleaned, etched or otherwise subjected to a surface treatment to promote adhesion between the over-molded element 10 and the polymeric base 70b. Preferably, in these aspects, the portion of the exterior surface 74 is subjected to a plasma-treatment to clean and etch this surface to promote adhesion of the over-molded element 10.

Referring now to FIGS. 1 and 2C, one implementation of an iridescent trim assembly 100c is depicted in a cross-sectional schematic, exemplified in the form of an iridescent vehicular grille. More particularly, the trim assembly 100c includes a polymeric base 70c defined at least in part by an exterior surface 74. In certain aspects, as shown in FIG. 2C, the polymeric base 70c of the trim assembly 100c contains a plating 80, which may by disposed over all or portions of a plated region 90. The plated region 90, as also shown in FIG. 2C, is disposed over all or a portion of the exterior surface 74 of the polymeric base 70c. The trim assembly 100c also includes an over-molded element 10 that comprises a polymeric, translucent material. The over-molded element 10 is defined by an exterior surface 12 and an interior surface 14. Further, the over-molded element 10 of the trim assembly 100c is joined to at least a portion of the polymeric base 70c and, more particularly, to at least a portion of the plating 80 and/or at least a portion of the plated region 90. Further, the over-molded element 10 includes one or more integral diffraction gratings 20 (see also FIG. 2D). In some implementations, as shown in FIG. 2D, the diffraction grating 20 has a thickness 38 from 250 to 1000 nanometers and a period 36 from about 50 nanometers to 5 microns.

According to certain aspects of the iridescent trim assembly 100c depicted in FIGS. 1 and 2C, the over-molded element 10 is fabricated from a silicone, preferably a low-viscosity, high flow material to promote flow during injection molding of one or more integral diffraction gratings 20. In some embodiments, the plating 80 over the plated region 90 is cleaned, etched or otherwise subjected to a surface treatment to promote adhesion between the over-molded element 10 and the plating 80. Preferably, the plating 80 is subjected to a plasma-treatment to clean and etch the plating 80 for this purpose. Further, in some embodiments of the trim assembly 100c, the plated region 90 of the polymeric base 70c is fabricated from one or more of an acrylonitrile butadiene styrene (ABS) and a polycarbonate material, as these materials are conducive, or otherwise can be configured, to promote adhesion of the plating 80 disposed on the plated region 90. Further, in some embodiments of the trim assembly 100c, the polymeric base 70c is tinted to exhibit one or more colors, white, grey and/or black features. As such, the polymeric base 70c can be fabricated from one or more polymeric materials including an acrylic, a polycarbonate, a polypropylene, a nylon, an acrylonitrile styrene acrylate and combinations of these polymeric materials. To the extent that the material and/or tinting employed in the polymeric base 70c is not conducive to plating, the incorporation of a plated region 90 as disposed over the exterior surface 74 of the polymeric base 70c, ensures that the plating 80 can effectively adhere to the base (i.e., via the plated region 90).

Figure 3:
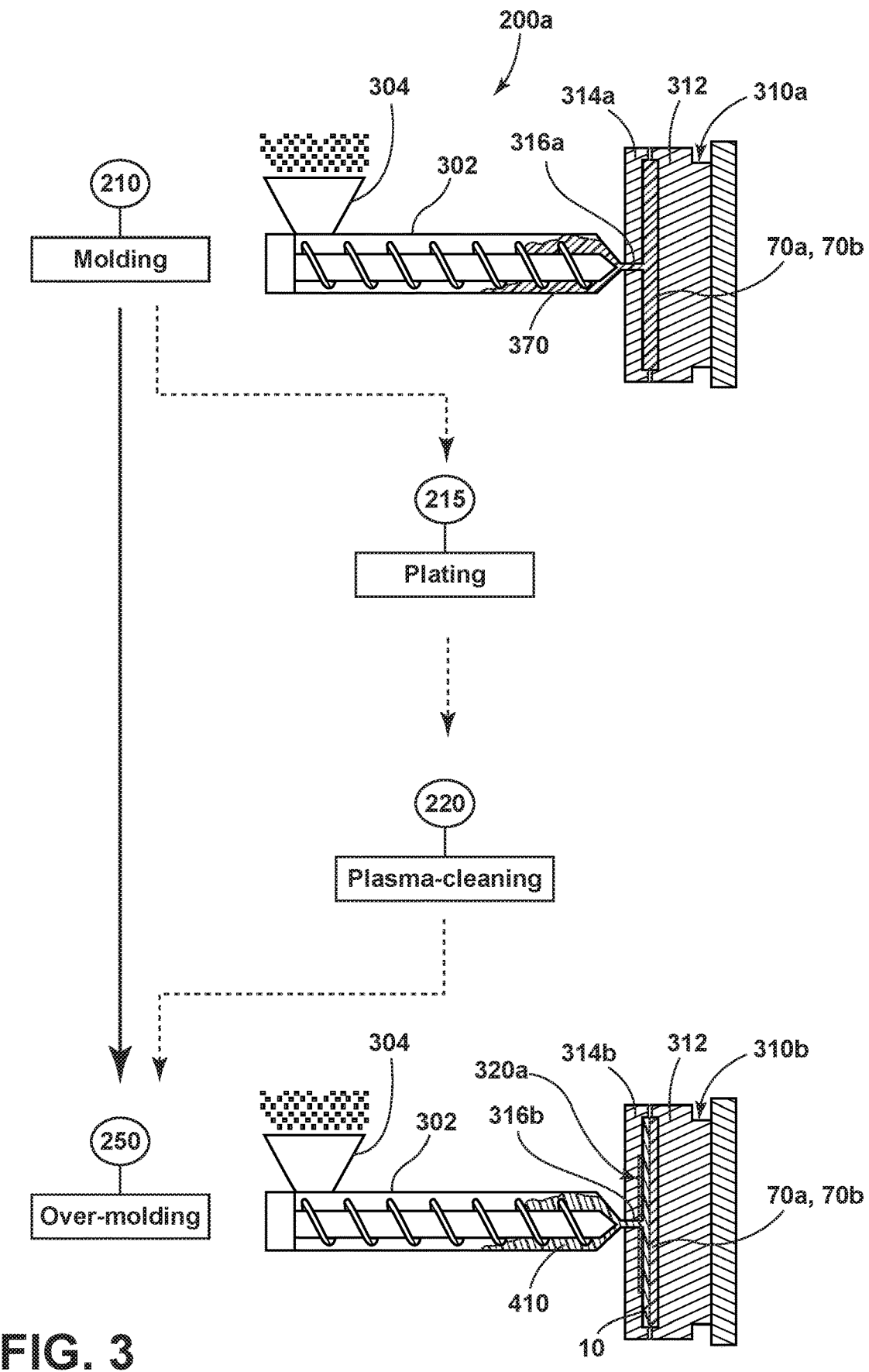
FIG. 3 is a flow chart schematic of a method of making an iridescent vehicular trim assembly according to another aspect of the disclosure.

According to another aspect of the disclosure, a method 200a of making an iridescent trim assembly, e.g., iridescent trim assembly 100a, 100b, is depicted in a schematic flow chart in FIG. 3. In the method 200a, a step 210 of molding a polymeric base, e.g., polymeric base 70a, 70b, that comprises an exterior surface, e.g., exterior surface 74 (see FIGS. 2A-2B). As shown in FIG. 3, an injection molding apparatus 302 with a hopper 304 for holding polymeric precursor material 370 can be employed to injection mold the polymeric base. In particular, the injection molding apparatus 302 can be operated at a sufficient temperature to melt or otherwise promote flow of the precursor material 370 through an orifice 316a into the mold 310a. The mold 310a includes two halves 312, 314a. As the precursor material 370 is driven through the orifice 316a and into a cavity defined by the mold halves 312, 314a, the mold 310a is cooled. Upon cooling in the cavity, the precursor material 370 is formed into the polymeric base, e.g., polymeric base 70a, 70b. At this point, the mold halves 312, 314a are separated and the polymeric base is removed.

Referring again to FIG. 3, the method 200a of making an iridescent trim assembly (e.g., trim assembly 100a, 100b) also includes a step 250 of over-molding an over-molded element, e.g., over-molded element 10 over at least a portion of the exterior surface of the polymeric base formed in step 210. As shown in FIG. 3, the injection molding apparatus 302 with a hopper 304 for holding polymeric precursor material 410 can be employed to injection mold the over-molded element, e.g., over-molded element 10. In particular, the injection molding apparatus 302 can be operated at a sufficient temperature to melt or otherwise promote flow of the precursor material 410 through an orifice 316b into the mold 310b. The mold 310b includes two halves 312, 314b. It should be understood that the mold half 314b contains a diffraction grating surface 320a, for forming one or more diffraction gratings, e.g., diffraction gratings 20 (see, e.g., FIG. 2D), integrally within the over-molded element 10. As the precursor material 410 is driven through the orifice 316b and into a cavity defined by the mold halves 312, 314b, the mold 310b is cooled. Upon cooling in the cavity, the precursor material 410 is formed into the over-molded element disposed over an exterior surface of the polymer base, e.g., an over-molded element 10 disposed over an exterior surface 74 of a polymeric base 70a, 70b. At this point in step 250, the mold halves 312, 314b are separated and the trim assembly containing the over-molded element and the polymeric base is removed, e.g., an iridescent trim assembly 100a, 100b (see, e.g., FIGS. 1, 2A and 2B).

According to some aspects of the method 200a for making an iridescent trim assembly as shown in FIG. 3, an optional step 215 for plating the exterior surface of the polymeric base can be conducted, e.g., to form a plating 80 over an exterior surface 74 of a polymeric base 70a (see FIG. 2A). More particularly, step 215 can be conducted after formation of the polymeric base in step 210. More particularly, the step 215 for plating can include the deposition of one or more materials capable of being deposited through conventional electro-plating technologies. In certain implementations, the step 215 is conducted to plate material, e.g., a plating 80, is over all or portions of the exterior surface of the polymeric base. In certain aspects, the plating formed from the step 215 can be fabricated from materials suitable for achieving a bright chrome, satin nickel, satin chrome, satin aluminum, gold, copper, silver, bronze and other finishes. These materials employed in the step 215 for plating can include one or more metals, e.g., nickel, chromium, aluminum, gold, silver and others. Further, other processes besides conventional electro-plating techniques may be employed in step 215 for purposes of preparing and forming the plated material, including but not limited to anodizing and vacuum deposition processing techniques.

According to another implementation of the method 200a for making an iridescent trim assembly as shown in FIG. 3, an optional step 220 can be conducted to clean the plated surface created in step 215. More particularly, the optional cleaning step 220 can be conducted prior to the formation and joining of the over-molded element in step 250. In step 220, the plating over the polymeric base and/or portions of the polymeric base itself can be contacted with a plasma arc for a period of time (e.g., 5 to 60 minutes) at an intensity sufficient to modify the surface of the plating and/or base to enhance adhesion of the polymeric material employed in the over-molded element during the subsequent step 250. In certain implementations of the method 200a, the plasma arc cleans the surface of the plating and/or polymeric base by forcibly removing impurities. The plasma arc also etches the surface of the plating and/or the polymeric base to a surface roughness indicative of material removal from about 20 to 500 Angstroms below the surface. In essence, the effect of the plasma arc on the plating and the polymeric base is to roughen its surface at a level not observable to the unaided eye, but at a level sufficient to enhance the bonding and joining of the over-molded element to the plating and/or polymeric base, as formed during step 250.

Figure 4:
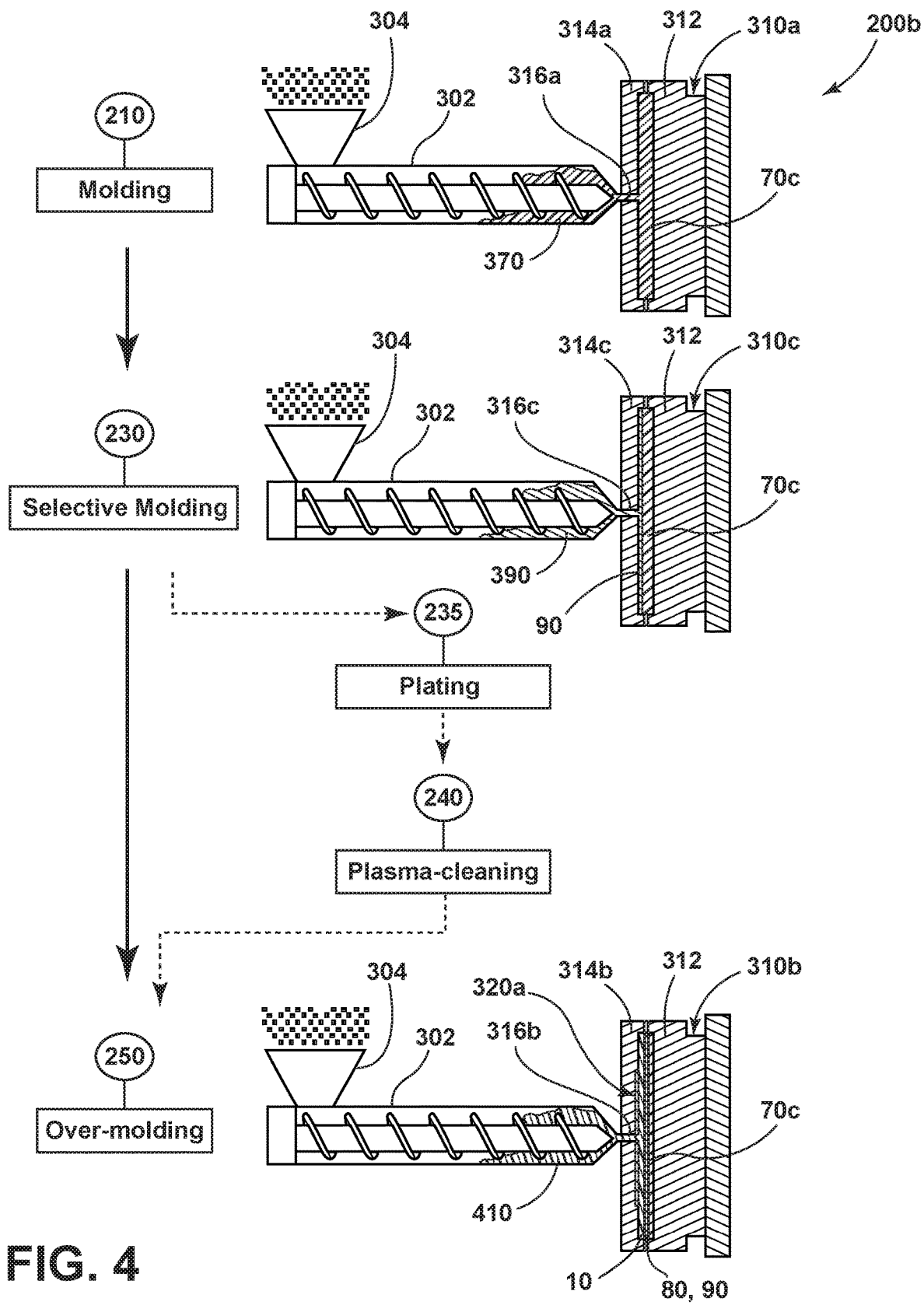
FIG. 4 is a flow chart schematic of a method of making an iridescent vehicular trim assembly according to a further aspect of the disclosure.

According to another aspect of the disclosure, a method 200b of making an iridescent trim assembly, e.g., iridescent trim assembly 100c, is depicted in a schematic flow chart in FIG. 4. In the method 200b, a step 210 of molding a polymeric base, e.g., polymeric base 70c, that comprises an exterior surface, e.g., exterior surface 74 (see FIG. 2C). As shown in FIG. 4, an injection molding apparatus 302 with a hopper 304 for holding polymeric precursor material 370 can be employed to injection mold the polymeric base. In particular, the injection molding apparatus 302 can be operated at a sufficient temperature to melt or otherwise promote flow of the precursor material 370 through an orifice 316a into the mold 310a. The mold 310a includes two halves 312, 314a. As the precursor material 370 is driven through the orifice 316a and into a cavity defined by the mold halves 312, 314a, the mold 310a is cooled. Upon cooling in the cavity, the precursor material 370 is formed into the polymeric base, e.g., a polymeric base 70c employed in an iridescent trim assembly 100c (see FIG. 2C). At this point, the mold halves 312, 314a are separated and the polymeric base is removed.

Referring again to FIG. 4, the method 200b of making an iridescent trim assembly, e.g., iridescent trim assembly 100c (see, e.g., FIG. 2C), also includes a step 230 of selectively molding a plated region, e.g., plated region 90 (see FIG. 2C). In the method 200b, the step 230 of selectively molding a plated region is conducted to mold the plated region over an exterior surface of the polymeric base, e.g., exterior surface 74 of the polymeric base 70c (see FIG. 2C). As shown in FIG. 4, an injection molding apparatus 302 with a hopper 304 for holding polymeric precursor material 390 can be employed to injection mold the plated region. In particular, the injection molding apparatus 302 can be operated at a sufficient temperature to melt or otherwise promote flow of the precursor material 390 through an orifice 316c into the mold 310c. The mold 310c includes two halves 312, 314c. As the precursor material 390 is driven through the orifice 316c and into a cavity defined by the mold halves 312, 314c, the mold 310c is cooled. Upon cooling in the cavity, the precursor material 390 is formed into the plated region over all or a portion of an exterior surface of the polymeric base, e.g., a polymeric base 70c employed in an iridescent trim assembly 100c (see FIG. 2C). At this point, the mold halves 312, 314c are separated and the polymeric base with the plated region is removed.

Still referring to FIG. 4, the method 200b of making an iridescent trim assembly (e.g., trim assembly 100c as shown in FIGS. 1 and 2C) also includes a step of 250 of over-molding an over-molded element, e.g., over-molded element 10 over at least portion of the exterior surface of the plated region and the polymeric base formed in steps 210 and 230. As shown in FIG. 4, the injection molding apparatus 302 with a hopper 304 for holding polymeric precursor material 410 can be employed to injection mold the over-molded element, e.g., over-molded element 10. In particular, the injection molding apparatus 302 can be operated at a sufficient temperature to melt or otherwise promote flow of the precursor material 410 through an orifice 316b into the mold 310b. The mold 310b includes two halves 312, 314b. It should be understood that the mold half 314b contains a diffraction grating surface 320a, for forming one or more diffraction gratings, e.g., diffraction gratings 20 (see, e.g., FIG. 2D), integrally within the over-molded element 10. As the precursor material 410 is driven through the orifice 316b and into a cavity defined by the mold halves 312, 314b, the mold 310b is cooled. Upon cooling in the cavity, the precursor material 410 is formed into the over-molded element disposed over the plated region and the polymer base, e.g., an over-molded element 10 disposed over a plated region 90 and the exterior surface 74 of a polymeric base 70c (see, e.g., FIG. 2C). At this point in step 250, the mold halves 312, 314b are separated and the trim assembly containing the over-molded element and the polymeric base is removed, e.g., an iridescent trim assembly 100c (see, e.g., FIGS. 1 and 2C).

According to some aspects of the method 200b for making an iridescent trim assembly as shown in FIG. 4, an optional step 235 for plating the exterior surface of the plated region formed in step 230 can be conducted. More particularly, the step 235 can be conducted according to the same principles outlined in connection with step 215 in the method 200a depicted in FIG. 3. Accordingly, step 235 can be used to form a plating (i.e., a plated material) over the plated region formed in the selective molding step 230 (e.g., a plating 80 as formed over a plated region 90 as shown in FIG. 2C). Still further, the method 200b can be conducted with an optional step 240 to clean the plated surface created in step 235. More particularly, the optional cleaning step 240 can be conducted in a manner consistent with the clean step 220 outlined earlier in connection with the method 200a (see FIG. 3), e.g., prior to the formation and joining of the over-molded element in step 250. In step 240, the plating, plated region and/or portions of the polymeric base can be contacted with a plasma arc for a period of time (e.g., 5 to 60 minutes) at an intensity sufficient to modify the surface of the plating, plated region and/or base to enhance adhesion of the polymeric material employed in the over-molded element during the subsequent step 250. In certain implementations of the method 200b, the plasma arc cleans the surface of the plating, plated region and/or polymeric base by forcibly removing impurities. The plasma arc also etches the surface of the plating, plated region and/or the polymeric base to a surface roughness indicative of material removal from about 20 to 500 Angstroms below the surface. In essence, the effect of the plasma arc on the plating, plated region and/or the polymeric base is to roughen its surface at a level not observable to the unaided eye, but at a level sufficient to enhance the bonding and joining of the over-molded element to the plating, plated region and/or polymeric base, as formed during step 250.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An iridescent, vehicular trim assembly, comprising:
a polymeric base comprising an exterior surface; and
an over-molded element joined to at least a portion of the exterior surface,
wherein each of the element and the base comprises a polymeric material and an exterior surface with an integral diffraction grating having a thickness from 250 to 1000 nanometers and a period from 50 nanometers to 5 microns.

2. The trim assembly according to claim 1, wherein the polymeric material of the over-molded element is a translucent silicone.

3. The trim assembly according to claim 2, wherein the at least a portion of the exterior surface of the base is a treated surface from one or both of a cleaning and an etching.

4. The trim assembly according to claim 3, wherein the at least a portion of the exterior surface of the base is a plasma-etched surface.

5. The trim assembly according to claim 4, wherein the polymeric base comprises at least one of an acrylonitrile butadiene styrene (ABS) and a polycarbonate.

6. The trim assembly according to claim 1, wherein the polymeric base is tinted in an as-molded configuration and comprises a polymeric material selected from the group consisting of an acrylic, a polycarbonate, a polypropylene, a nylon, an acrylonitrile styrene acrylate and combinations of these polymeric materials.

7. The trim assembly according to claim 1, wherein the diffraction grating comprises a thickness from about 390 nm to about 700 nm and a period from about 150 nm to about 400 nm.

8. An iridescent, vehicular trim assembly, comprising:
a polymeric base;
a plated region and a plating over at least a portion of the polymeric base; and
an over-molded element joined to the at least a portion of the base,
wherein the element comprises a polymeric, translucent material and an exterior surface with an integral diffraction grating having a thickness from 250 to 1000 nanometers and a period from 50 nanometers to 5 microns.

9. The trim assembly according to claim 8, wherein the over-molded element is joined to one or both of at least a portion of the plating and at least a portion of the plated region.

10. The trim assembly according to claim 8, wherein the polymeric material of the over-molded element is a silicone.

11. The trim assembly according to claim 10, wherein one or both of the at least a portion of the plating and the at least a portion of the plated region is a treated surface from one or both of a cleaning and an etching.

12. The trim assembly according to claim 11, wherein the plated region comprises at least one of an acrylonitrile butadiene styrene (ABS) and a polycarbonate.

13. The trim assembly according to claim 8, wherein the polymeric base is tinted in an as-molded configuration and comprises a polymeric material selected from the group consisting of an acrylic, a polycarbonate, a polypropylene, a nylon, an acrylonitrile styrene acrylate and combinations of these polymeric materials.

14. The trim assembly according to claim 8, wherein the diffraction grating comprises a thickness from about 390 nm to about 700 nm and a period from about 150 nm to about 400 nm.

15. An iridescent, vehicular trim assembly, comprising:
a polymeric base comprising an exterior surface; and
an over-molded element joined to at least a portion of the exterior surface,
wherein each of the element and the base comprises a polymeric material and one of the element and the base comprises an exterior surface with an integral diffraction grating having a thickness from 250 to 1000 nanometers and a period from 50 nanometers to 5 microns.

16. The trim assembly according to claim 15, wherein the polymeric material of the over-molded element is a translucent silicone.

17. The trim assembly according to claim 16, wherein the at least a portion of the exterior surface of the base is a treated surface from one or both of a cleaning and an etching.

18. The trim assembly according to claim 17, wherein the polymeric base comprises at least one of an acrylonitrile butadiene styrene (ABS) and a polycarbonate.

19. The trim assembly according to claim 15, wherein the polymeric base is tinted in an as-molded configuration and comprises a polymeric material selected from the group consisting of an acrylic, a polycarbonate, a polypropylene, a nylon, an acrylonitrile styrene acrylate and combinations of these polymeric materials.

20. The trim assembly according to claim 15, wherein the diffraction grating comprises a thickness from about 390 nm to about 700 nm and a period from about 150 nm to about 400 nm.

* * * * *